UNITED STATES PATENT OFFICE.

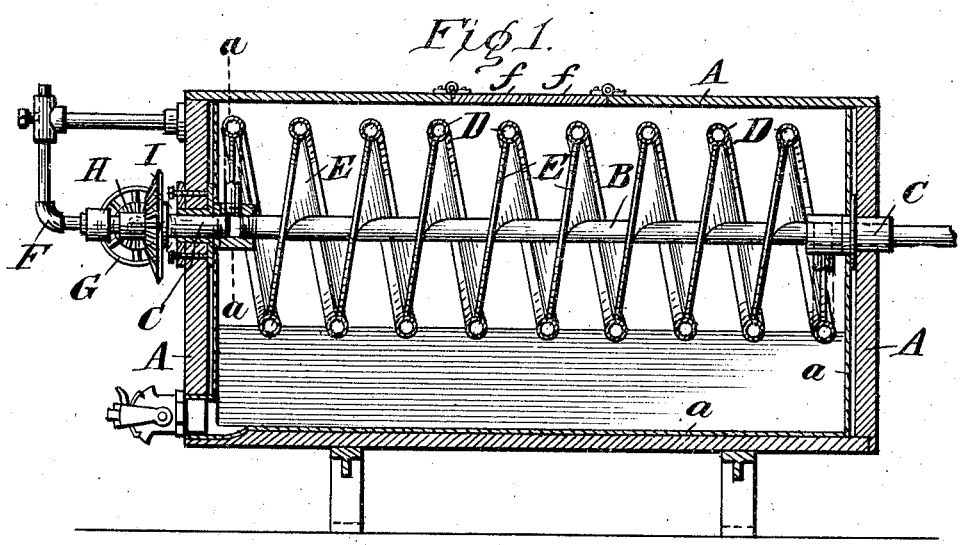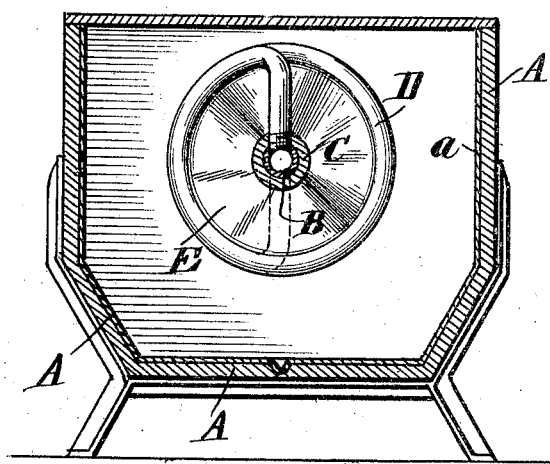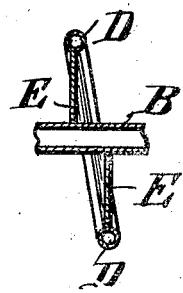

JOHN T. HANNA, OF LONE ROCK, IOWA.

CREAM-RIPENER.

No. 923,047.      Specification of Letters Patent.      Patented May 25, 1909.

Application filed December 22, 1908. Serial No. 468,758.

*To all whom it may concern:*

Be it known that I, JOHN T. HANNA, a citizen of the United States, residing at Lone Rock, in the county of Kossuth and State of Iowa, have invented certain new and useful Improvements in Cream-Ripeners, of which the following is a specification, reference being had therein to the accompanying drawing.

My invention relates to certain improvements in apparatus for ripening cream; by the ripening of cream, I refer to that one of the several processes which constitute butter-making on a large scale, whose purpose is to properly prepare the butter fat for its separation from the serum when in the churn, to assist in the development of the required butter flavor, and to harden the particles so that the proper firmness of the ultimate product will be insured, all of which is preparatory to the churning of the cream.

The object of my invention is to provide an apparatus for use in connection with the process above referred to, the advantages of which consist in the fact that I secure a more even and thorough agitation of the cream, and a more even and rapid cooling thereof.

Referring to the drawings; Figure 1 is a vertical longitudinal section taken through the apparatus. Fig. 2 is a vertical end section taken through the line *a—a* of Fig. 1. Fig. 3 is a longitudinal section in detail of a portion of the coil and spiral.

In the said drawing A represents a vat, which is of the size and capacity used in modern creameries for the ripening of cream, and is, preferably, of wood and may be of any suitable construction. The vat A is provided with a lining "*a*" of a metal which is known to be unacted upon by any of the substances included in the chemical constitution of cream. The door *f, f*, suitably hinged to the vat A, serves for the introduction of quantities of cream, which is indicated to a certain level in the vat.

Referring now particularly to the elements which constitute my improvements in the device for tempering and agitating the cream so as to secure its proper ripening; B represents a hollow revoluble shaft, mounted in suitable bearings C, C, in the ends of the vat. The shaft B should be constructed of a metal unacted on, exteriorly, by any of the constituents of the cream, or interiorly by steam, hot water or brine which may be circulated through it. Surrounding the shaft B, and, preferably, equidistant therefrom throughout its course is a tubular coil, or hollow pipe disposed in spiral form, D, the interior of which communicates with hollow shaft B near both ends of the vat, and through both of which steam, warm water, cold water, or brine may be circulated according to the temperature requirements of the several steps of cream ripening. The shaft B and coil D are connected by a web or spiral E of thin metal, which should, preferably, consist of tinned iron or tinned copper, the exterior tin surface being known to be unacted on by the various constituents of cream. The said web or spiral E is of uniform thickness throughout its course and may be soldered or otherwise securely attached to the inner exterior surface of the coil D and the exterior surface of the shaft B. The shafts B, web E, and coil D thus rotate together. A pipe F serves for the introduction of the liquid circulating medium in the shaft and coil, and motion is communicated to the said revoluble members by a pulley G and bevel gears H and I.

In operation, when the vat is charged with the proper quantities of cream which is to be ripened, the temperature of the cream will first be lowered by circulation of a cooling liquid medium through the hollow shaft and coil, so as to check or retard fermentation; then raised, so as to hasten fermentation to the required degree of acidity; and finally again lowered so as to arrest any further fermentation and thus prevent acidity beyond the degree required. During these operations the cream is in rapid circulation, as the rotating spiral and coil act as a propeller, and the movement of the cream is partly longitudinal, and partly toward the bottom and sides of the vat. By the construction herein described, I obtain a more thorough and more even agitation of the cream than has heretofore existed in any preceding structure. It is often desirable in the ripening of cream, when changing from the various heating steps to cooling, or vice versa, that the temperature effects be obtained quickly. Now, in operating my device, the movement of the spiral E will not only set the cream into the agitated state required, but will force it to flow chiefly in a radial direction outwardly from the region of shaft B and over the coil D, where, being subjected to the comparatively large heating or cooling surface of said coil, the cream will have the required temperature changes imparted to it in a consistently even and rapid manner.

Having thus described my invention, what I claim is:

1. In an apparatus for ripening cream, the combination of a revoluble shaft having suitable bearings, a hollow coil surrounding said shaft, and a spiral web connecting the said coil and said shaft, for the purpose set forth, substantially as described.

2. In an apparatus for ripening cream, the combination of a shaft having suitable bearings, a hollow coil surrounding said shaft, and a spiral web attached to said coil and to said shaft, all the members being capable of rotation as one member, whereby a confined body of cream is caused to circulate outwardly from the said shaft and over the said coil for obtaining the requisite heating or cooling action, substantially as described.

3. In a device of the character described, the combination of the revoluble hollow shaft B, a spiral web E secured to said shaft and a hollow coil D attached to the outer edge of the said spiral web and connected with and communicating at both its ends with the said shaft B, substantially as and for the purposes set forth.

In testimony whereof I hereunto affix my signature in presence of two witnesses.

JOHN T. HANNA.

Witnesses:
W. T. KENNEDY,
L. S. WHEELER.